US007698478B2

(12) United States Patent
Wang et al.

(10) Patent No.: US 7,698,478 B2
(45) Date of Patent: Apr. 13, 2010

(54) MANAGED CREDIT UPDATE

(75) Inventors: James Wang, Milpitas, CA (US); Choon Ping Chng, Sunnyvale, CA (US); Mark D. Hayter, Menlo Park, CA (US); Ruchi Wadhawan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 11/523,330

(22) Filed: Sep. 19, 2006

(65) Prior Publication Data

US 2008/0126606 A1  May 29, 2008

(51) Int. Cl.
*G06F 3/00* (2006.01)
(52) U.S. Cl. ...................................................... 710/29
(58) Field of Classification Search ........................ None
See application file for complete search history.

(56) References Cited

U.S. PATENT DOCUMENTS

| 5,832,245 | A | 11/1998 | Gulick |
| 6,192,028 | B1 | 2/2001 | Simmons et al. |
| 6,636,523 | B1 | 10/2003 | Lau et al. |
| 7,464,174 | B1 * | 12/2008 | Ngai ........................... 709/234 |
| 2002/0159385 | A1 * | 10/2002 | Susnow et al. .............. 370/229 |
| 2003/0226046 | A1 * | 12/2003 | John ........................... 713/300 |
| 2004/0049564 | A1 * | 3/2004 | Ng et al. ..................... 709/223 |
| 2005/0060558 | A1 * | 3/2005 | Hussain et al. .............. 713/189 |
| 2007/0121495 | A1 * | 5/2007 | Breti et al. .................. 370/229 |

OTHER PUBLICATIONS

PCI Express Base Specification, Rev, 1.0a, 2002, pp. 100-110, 123-127.

\* cited by examiner

*Primary Examiner*—Henry W. H. Tsai
*Assistant Examiner*—Kris Rhu
(74) *Attorney, Agent, or Firm*—Lawrence J. Merkel; Meyertons, Hood, Kivlin, Kowert & Goetzel, P.C.

(57) ABSTRACT

In one embodiment, a system comprises at least one processor and a peripheral interface controller coupled to the processor. Further coupled to receive transactions from a peripheral interface, the peripheral interface controller is configured to accumulate freed credits for a given transaction type of a plurality of transaction types that are not yet returned to a transmitter on the peripheral interface. The peripheral interface controller is also configured to cause transmission of a flow control update transaction on the peripheral interface responsive to a number of the freed credits exceeding a threshold amount that is less than a total number of credits allocated to the given transaction type.

21 Claims, 2 Drawing Sheets

MANAGED CREDIT UPDATE

BACKGROUND

1. Field of the Invention

This invention is related to the field of interface controllers and, more particularly, to updating flow control credits for transmissions on an interface.

2. Description of the Related Art

Various interfaces are used to communicate among components of an electronic system. For example, components integrated on the same semiconductor substrate (e.g. a system on a chip configuration) use intrachip interfaces to communicate. Similarly, separate circuit components (e.g. separate chips) communicate using interfaces that are physically realized on a circuit board to which those components are connected.

In many cases, the interfaces need to be flow controlled. Generally, flow control is needed whenever a receiver of a transaction on the interface may sometimes not be capable of receiving the transaction. For example, if the receiver has a queue to store transactions until they can be processed, the queue may fill and new transactions cannot be received until queue space is available. As used herein, a transaction may refer to any communication from a transmitter to a receiver on an interface. For example, if the interface is a bus, the transaction may be a transmission on the bus. If the interface is packet-based, a transaction may be a packet. In general, an interface may include any predefined communication medium and the protocol for communicating on the medium (e.g. transaction definitions).

Accordingly, flow control refers to any mechanism that may be used to control the flow of transactions on the interconnect. One common method of flow control is typically referred to as "retry". In retry mechanisms, a transmitter attempts to transmit a transaction on the interconnect and, if the receiver cannot handle the transaction currently, the receiver signals a retry to the transmitter. The transmitter cancels the transaction internally, and may reattempt the transaction later. On a bus-based interface, the retry may be signalled via a signal on the interface. On a packet-based interface, the retry may be signalled by a negative acknowledgement packet (and positive acknowledgement packets may be used if no retry is desired).

Retry mechanisms waste bandwidth on the interface, since transactions that are attempted and retried use bandwidth that could otherwise be used to transmit transactions that are not retried. Another flow control mechanism that avoids retry is a credit-based flow control mechanism. In a credit-based system, the receiver advertises the number of credits it has allocated to a given transaction type. The credits may generally be a measure of the number of transactions that the receiver can accept before processing a received transaction to an implementation-dependent point at which the credit is freed. A transmitter records the number of credits, and consumes credits as transactions are transmitted to the receiver. If the transmitter reduces the credit count to zero, the transmitter inhibits transmitting additional transactions to the receiver until credits are freed. Thus, bandwidth is not wasted on transactions that would be retried because of flow control reasons.

For example, in the Peripheral Component Interconnect Express (PCIe) interface, a credit based system is used. Credits are indicated as freed by transmitting flow control update packets from the receiver to the transmitter. PCIe defines two required mechanisms for generating flow control packets. First, if the free credits at the transmitter for a given transaction type (as defined in the PCIe specification) are less than the number required to transmit a maximum payload sized packet and the receiver has at least one freed credit, the receiver generates a flow control update packet. Second, a timer is established (e.g. between 30 microseconds and 120 microseconds, dependent on a power savings mode of the system), and the receiver generates a flow control update packet each time the timer expires. The first mechanism may not sustain the streaming of transactions when the credits are consumed, which reduces throughput. In order to prevent starvation of credits, large buffers are required in PCIe devices. The second mechanism does not generate flow control updates frequently enough to prevent credits from being starved, either, in at least some cases. A third mechanism that is recommended, but not required, is to generate flow control update packets at the expiration of a timer that has a time interval equal to the sum of the internal delay and a fraction whose numerator is the sum of the maximum payload size and the packet overhead, multiplied by an update factor, and whose denominator is the link width. This third mechanism again requires a large buffer to support streaming transactions, since it is a fixed interval used to deal with a dynamic flow of transactions of different sizes.

SUMMARY

In one embodiment, a system comprises at least one processor and a peripheral interface controller coupled to the processor. Further coupled to receive transactions from a peripheral interface, the peripheral interface controller is configured to accumulate freed credits for a given transaction type of a plurality of transaction types that are not yet returned to a transmitter on the peripheral interface. The peripheral interface controller is also configured to cause transmission of a flow control update transaction on the peripheral interface responsive to a number of the freed credits exceeding a threshold amount that is less than a total number of credits allocated to the given transaction type.

In another embodiment, an apparatus comprises at least one buffer coupled to receive transactions from an interface and a control unit coupled to the buffer. The control unit is configured to generate a flow control update request to return freed credits to a transmitter on the interface responsive to a number of freed credits that are not yet returned to the transmitter exceeding a threshold amount. The freed credits correspond to a given transaction type of a plurality of transaction types on the interface, and the threshold amount is less than a total number of credits allocated to the given transaction type.

In another embodiment, a method comprises processing one or more transactions received with respect to a given transaction type on an interface, wherein processing the transactions frees flow control credits used to flow control on the interface for the given transaction type; and generating a flow control update request to return freed flow control credits to a transmitter on the interface responsive to a number of the freed flow control credits exceeding a threshold amount that is less than a total number of credits allocated to the given transaction type.

BRIEF DESCRIPTION OF THE DRAWINGS

The following detailed description makes reference to the accompanying drawings, which are now briefly described.

Figure 1:
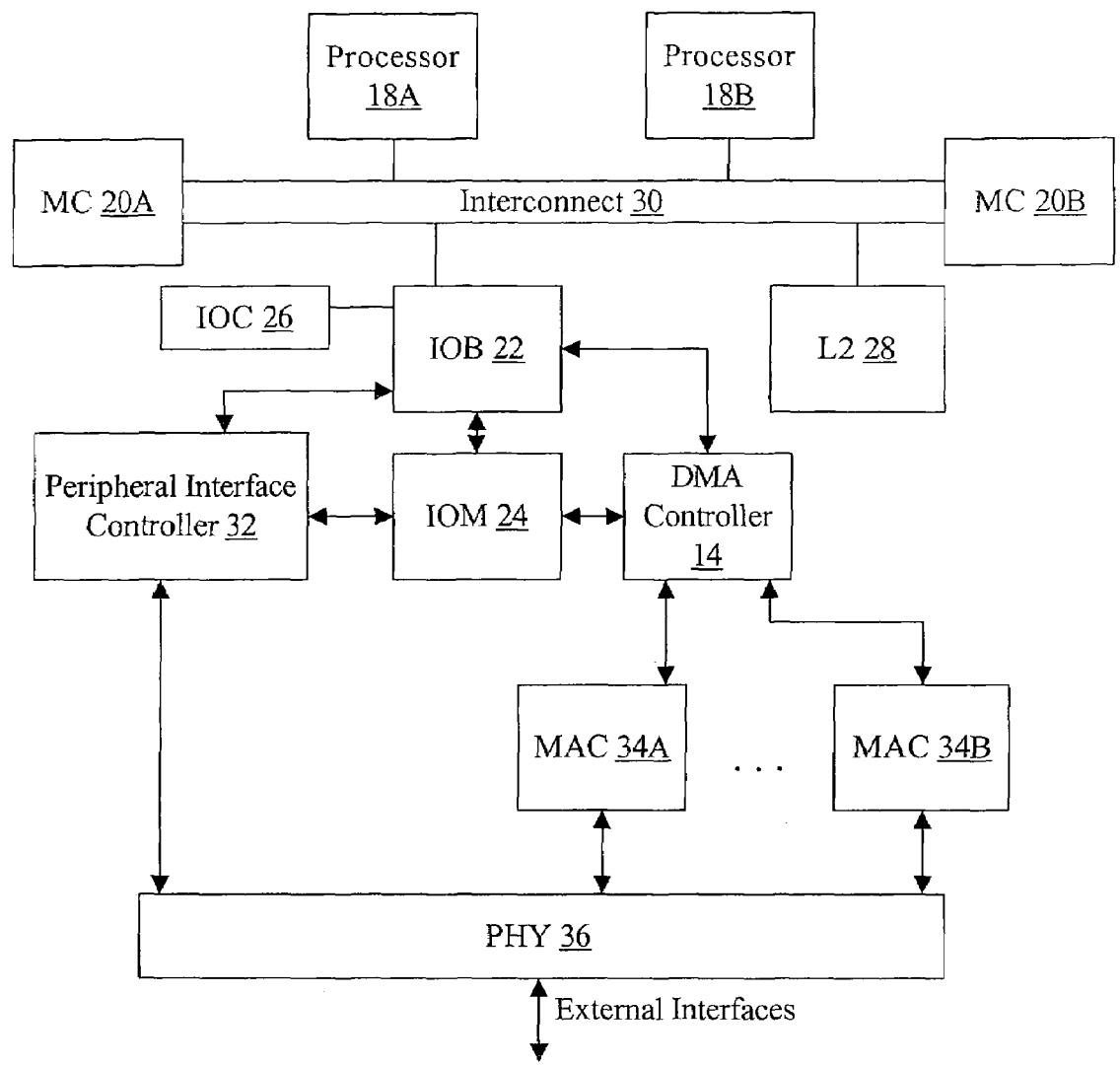
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In one embodiment, an interface controller is configured to communicate on an interface. For example, a peripheral interface controller may communicate on a peripheral interface such as the PCIe interface. The interface may use credits for flow control. The interface controller may be configured to receive transactions on the interface, and to accumulate freed credits as the transactions are processed (e.g. forwarded from the receive buffer to a target, or otherwise processed to an implementation dependent point at which resources are available to receive a new transaction). The interface controller may also be configured to generate a flow control update transaction on the interface to return freed credits to a transmitter on the interface (so that the transmitter can use the credits to transmit additional transactions). Particularly, the interface controller may be configured with one or more thresholds and may generate the flow control update transaction when the number of freed credits exceeds (or meets) the threshold. The threshold amount may generally be less than the total number of credits available. In this fashion, the credits may be freed rapidly enough to permit streaming of transactions from the transmitter without interruption to await credits, in some embodiments. That is, the freed credits may be returned to the transmitter prior to the transmitter exhausting the total number of credits, and thus may permit the transmitter to continue transmitting additional transactions without delay. Additionally, a smaller receive buffer may be implemented without loss of performance, in some cases, because the credits are freed more frequently and thus are less likely to run out. In some embodiments, the threshold is programmable and thus may be tuned to balance the overhead on the interface of the flow control update transactions versus the return of freed credits to the transmitter to support the transmission of additional transactions.

A flow control update transaction may be any transaction on the interface that is defined to transmit credits from a receiver to a transmitter. For example, in the PCIe interface, the UpdateFC packet may be a flow control update transaction. The UpdateFC packet provides an update for one credit type, and thus multiple UpdateFC packets may be used to transmit different credits. Other embodiments may define flow control update transactions that provide for more than one credit type in a transaction, up to flow control update transactions that provide all credit types in one transaction.

While a peripheral interface controller and peripheral interface is used as an example herein, any interface may be used in other embodiments. For example, the interconnect between the processors, memory controllers, L2 cache, and I/O bridge in FIG. 1 may be another example of an interface. Furthermore, any device that receives transactions on the interface (either targeted at the device or to pass through the device, e.g. in a daisy chain configuration) may implement the thresholds and generation of flow control update transactions described herein.

System Overview

Turning now to FIG. 1, a block diagram of one embodiment of a system 10 is shown. In the illustrated embodiment, the system 10 includes one or more processors such as processors 18A-18B, one or more memory controllers such as memory controllers 20A-20B, an I/O bridge (IOB) 22, an I/O memory (IOM) 24, an I/O cache (IOC) 26, a level 2 (L2) cache 28, an interconnect 30, a DMA controller 14, a peripheral interface controller 32, one or more media access control circuits (MACs) such as MACs 34A-34B and a physical interface layer (PHY) 36. The peripheral interface controller 32 and the MACs 34A-34B are coupled to the physical interface layer 36, which is further coupled to one or more external interfaces. The processors 18A-18B, memory controllers 20A-20B, IOB 22, and L2 cache 28 are coupled to the interconnect 30. The IOB 22 is further coupled to the IOC 26 and the IOM 24. The DMA controller 14 is also coupled to the IOB 22 and the IOM 24, and to the MACs 34A-34B. The peripheral interface controller 32 is also coupled to the IOB 22 and the IOM 24. In some embodiments, the components of the system 10 may be integrated onto a single integrated circuit as a system on a chip. In other embodiments, the system 10 may be implemented as two or more integrated circuits.

The peripheral interface controller 32 comprises circuitry configured to control a peripheral interface. Peripheral devices may include various input/output (I/O) devices. In one embodiment, the peripheral interface controller 32 may control a Peripheral Component Interconnect (PCI) Express (PCIe) interface. Other embodiments may implement other peripheral interfaces (e.g. PCI, PCI-X, universal serial bus (USB), etc.). The PCIe interface will be used as an example below, but any other interface may be used in other embodiments.

The DMA controller 14 is configured to perform DMA transfers between at least the MACs 34A-34B and the host address space (e.g. memory controlled by the memory controllers 20A-20B, and other addresses in the address space). Particularly, the DMA transfers may be between memory locations and the MACS 34A-34B. Additionally, the DMA controller 14 may, in some embodiments, be configured to perform DMA transfers between sets of memory locations. In some embodiments, the DMA controller 14 may further comprise a DMA assist for the peripheral interface controller 32. The DMA controller 14 may also be configured to perform one or more operations (or "functions") on the DMA data as the DMA data is being transferred, in some embodiments. In one embodiment, some of the operations that the DMA controller 14 performs are operations on packet data (e.g. encryption/decryption, cyclical redundancy check (CRC) generation or checking, checksum generation or checking, etc.). The operations may also include an exclusive OR (XOR) operation, which may be used for redundant array of inexpensive disks (RAID) processing, for example.

The processors 18A-18B comprise circuitry to execute instructions defined in an instruction set architecture implemented by the processors 18A-18B. Any instruction set architecture may be implemented in various embodiments. For example, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

The memory controllers 20A-20B comprise circuitry configured to interface to memory. For example, the memory controllers 20A-20B may be configured to interface to dynamic random access memory (DRAM) such as synchronous DRAM (SDRAM), double data rate (DDR) SDRAM, DDR2 SDRAM, Rambus DRAM (RDRAM), etc. The memory controllers 20A-20B may receive read and write transactions for the memory to which they are coupled from the interconnect 30, and may perform the read/write operations to the memory. The read and write transactions may include read and write transactions initiated by the IOB 22 on behalf of the DMA controller 14 and/or the peripheral interface controller 32. Additionally, the read and write transactions may include transactions generated by the processors 18A-18B and/or the L2 cache 28.

The L2 cache 28 may comprise a cache memory configured to cache copies of data corresponding to various memory locations in the host address space. The L2 cache 28 may comprise any capacity and configuration (e.g. direct mapped, set associative, etc.).

The IOB 22 comprises circuitry configured to communicate transactions on the interconnect 30 on behalf of the DMA controller 14 and the peripheral interface controller 32. The interconnect 30 may support cache coherency, and the IOB 22 may participate in the coherency and ensure coherency of transactions initiated by the IOB 22. In the illustrated embodiment, the IOB 22 employs the IOC 26 to cache recent transactions initiated by the IOB 22. The IOC 26 may have any capacity and configuration, in various embodiments, and may be coherent. The IOC 26 may be used, e.g., to cache blocks of data which are only partially accessed due to reads/writes generated by the DMA controller 14 and the peripheral interface controller 32. Using the IOC 26, read-modify-write sequences may be avoided on the interconnect 30, in some cases. Additionally, transactions on the interconnect 30 may be avoided by a cache hit in the IOC 26 for a read/write generated by the DMA controller 14 or the peripheral interface controller 32 if the IOC 26 has sufficient ownership of the cache block to complete the read/write. Other embodiments may not include the IOC 26.

The IOM 24 may be used as a staging buffer for data being transferred between the IOB 22 and the peripheral interface 32 or the DMA controller 14. Thus, the data path between the IOB 22 and the DMA controller 14/peripheral interface controller 32 may be through the IOM 24. The control path (including read/write requests, addresses in the host address space associated with the requests, etc.) may be between the IOB 22 and the DMA controller 14/peripheral interface controller 32 directly. The IOM 24 may not be included in other embodiments.

The interconnect 30 may comprise any communication medium for communicating among the processors 18A-18B, the memory controllers 20A-20B, the L2 cache 28, and the IOB 22. For example, the interconnect 30 may be a bus with coherency support. The interconnect 30 may alternatively be a point-to-point interconnect between the above agents, a packet-based interconnect, or any other interconnect.

The MACs 34A-34B may comprise circuitry implementing the media access controller functionality defined for network interfaces. For example, one or more of the MACs 34A-34B may implement the Gigabit Ethernet standard. One or more of the MACs 34A-34B may implement the 10 Gigabit Ethernet Attachment Unit Interface (XAUI) standard. Other embodiments may implement other Ethernet standards, such as the 10 Megabit or 100 Megabit standards, or any other network standard. In one implementation, there are 6 MACs, 4 of which are Gigabit Ethernet MACs and 2 of which are XAUI MACs. Other embodiments may have more or fewer MACs, and any mix of MAC types. Among other things, the MACs 34A-34B that implement Ethernet standards may strip off the inter-frame gap (IFG), the preamble, and the start of frame delimiter (SFD) from received packets and may provide the remaining packet data to the DMA controller 14 for DMA to memory. Other embodiments of the MACs 34A-34B may not strip the IFG, preamble, and SFG from the received packets, and may instead provide the raw packet data to the DMA controller 14 for DMA to memory. The MACs 34A-34D may be configured to insert the IFG, preamble, and SFD for packets received from the DMA controller 14 as a transmit DMA transfer, and may transmit the packets to the PHY 36 for transmission.

The PHY 36 may generally comprise the circuitry configured to physically communicate on the external interfaces to the system 10 under the control of the peripheral interface controller 32 and/or the MACs 34A-34B. In one particular embodiment, the PHY 36 may comprise a set of serializer/deserializer (SERDES) circuits that may be configured for use as PCI Express lanes or as Ethernet connections. The PHY 36 may include the circuitry that performs 8b/10b encoding/decoding for transmission through the SERDES and synchronization first-in, first-out (FIFO) buffers, and also the circuitry that logically configures the SERDES links for use as PCI Express or Ethernet communication links. In one implementation, the PHY may comprise 24 SERDES that can be configured as PCI Express lanes or Ethernet connections. Any desired number of SERDES may be configured as PCI Express and any desired number may be configured as Ethernet connections.

It is noted that, in various embodiments, the system 10 may include one or any number of any of the elements shown in FIG. 1 (e.g. processors, memory controllers, caches, I/O bridges, DMA controllers, peripheral interface controllers, and/or MACs, etc.).

Figure 2:
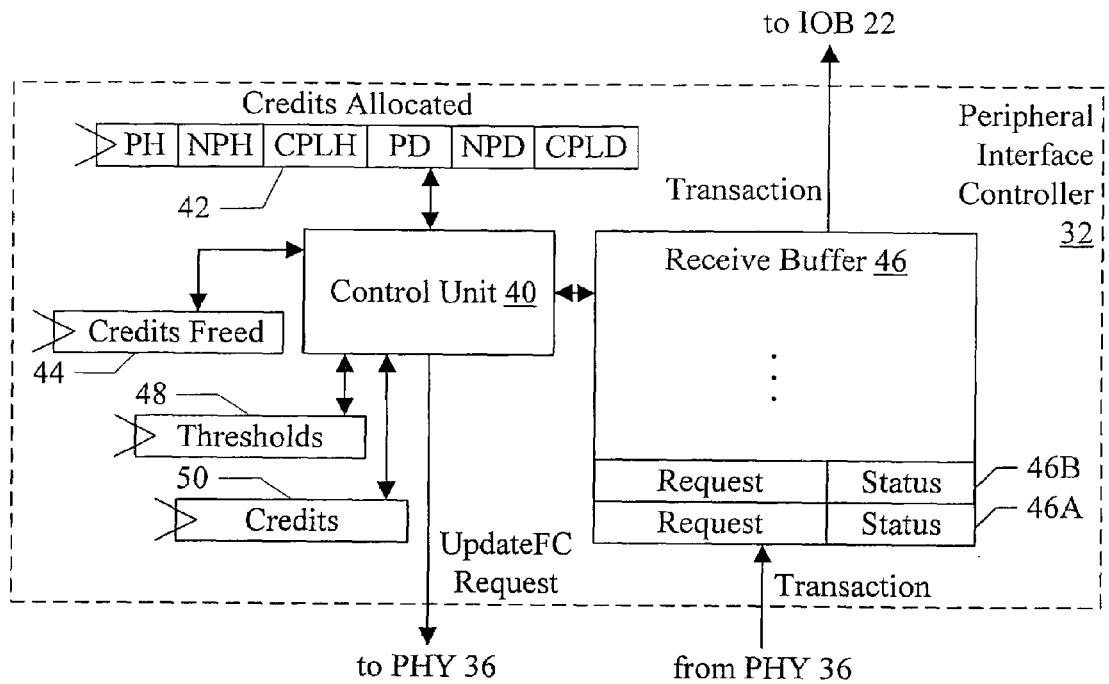
FIG. 2 is a block diagram of one embodiment of a peripheral interface controller shown in FIG. 1.

Peripheral Interface Controller,

Turning now to FIG. 2, a block diagram of one embodiment of a portion of the peripheral interface controller 32 is shown. The portion shown in FIG. 2 includes circuitry involved in receiving transactions from the PHY 36 and forwarding the transactions to the IOB 22. Other circuitry, not shown, may handle receiving requests from the IOB 22 and other functionality such as forming outgoing requests into PCIe transactions for transmission and decoding received transmissions. In the illustrated embodiment, the peripheral interface controller 32 includes a control unit 40, a receive buffer 46, a credits allocated register 42, a credits freed register 44, a thresholds register 48, and a credits register 50. The receive buffer 46 is coupled to receive transactions from the PHY 36 and to provide transactions to the IOB 22. The control unit 40 is coupled to the receive buffer 46 and to the registers 42, 44, 48, and 50. Additionally, the control unit is coupled to transmit an UpdateFC request to the PHY 36.

The receive buffer 46 is coupled to receive transactions from the PHY 36, and to provide the transactions to the IOB 22. More particularly, the PHY 36 may decode the transactions from the transmission medium and supply the transaction in any desired internal format. The peripheral interface controller 32 may further reformat the transaction for the IOB 22. The transaction may be passed through the IOM 24 to the IOB 22. Alternatively, PHY 36 may reassemble the transaction and provide the transaction to the receive buffer 46 for storage without transformation into an internal format.

The control unit 40 may be configured to monitor the transactions that are forwarded to the IOB 22/IOM 24, and to free credits that were consumed by those transactions. Thus, in this embodiment, processing the received transactions may include forwarding the transactions to an internal target. In other embodiments, processing a transaction may refer to internally completing the transaction (e.g. embodiments in which the receiver of the transaction is the target, such as a PCIe device).

In the illustrated embodiment, the control unit 40 may use the registers 42, 44, 48, and 50 in tracking credits. The register 42 is shown in more detail in FIG. 2, having 6 fields in this embodiment, which may be used for a PCIe implementation. Other registers 44, 48, and 50 may have similar fields. PCIe has three transaction types: posted transactions, nonposted transactions, and completion transactions (or more succinctly, completions). Separate credits are defined for each of the three transaction types. Additionally, separate credits are defined for packet headers and for data. Accordingly, the six fields in the embodiment of FIG. 2 correspond to the three transaction types and header or data for those three types. The fields are labeled PH (posted header), NPH (nonposted header), CPLH (completion header), PD (posted data), NPD (nonposted data), and CPLD (completion data). Each field in a given register stores credit information for the corresponding transaction type and for header or data, as the field name specifies. In general, there may be one or more sets of credits available on the interface, and there may be a field in the registers 42, 44, 48, and 50 for each set of credits.

The credits freed register 44 may store values that represent the number of credits that have been freed by the processing of transactions in the receive buffer 46 since the most recent transmission of a flow control update transaction for each set of credits. The thresholds register 48 may store corresponding thresholds for each set of credits. Thus, in this embodiment, the thresholds are programmable (e.g. via instructions executed by one of the processors 18A-18B). In other embodiments, the thresholds may be fixed (e.g. predetermined in hardware, determined at manufacture by blowing fuses, etc.) or programmable in other fashions such as pin strapping. The thresholds may be measured in any manner (e.g. a percentage of the total number of credits available in a set, a raw number of credits, etc.).

Responsive to the freed credits recorded in the credits freed register 44 and the corresponding thresholds in the thresholds register 48, the control unit 40 may determine if a threshold has been exceeded (or met) for at least one of the sets of credits. If at least one threshold has been met/exceeded, the control unit 40 may generate a flow control update request to the PHY 36, which may transmit a corresponding flow control update transaction on the interface. The flow control update request may be formatted as the flow control update transaction. Alternatively, the flow control update request may have an internal format that the PHY 36 may format into a transaction on the PCIe interconnect. The flow control update request may include an identification of the set of credits being updated and the corresponding value to be transmitted.

In PCIe, the value transmitted in a flow control update transaction (referred to as an UpdateFC transaction) is a credits allocated value, which represents the total number of credits allocated to the transmitter (including credits that were previously consumed and subsequently freed). This value is tracked in the credits allocated register 42. The credits allocated register may be initialized, for each field, with the total number of credits provided by the peripheral interface controller 32 (e.g. the maximum number of corresponding headers or data that may be outstanding in the request buffer 46 at one time). Thus, for example, if 5 posted header credits are initially advertised by the peripheral interface controller 32, the PH field of the register 42 may be initialized to 5. After 3 posted headers have been transmitted to the receive buffer 46 and processed, the PH field of the register 42 is updated to 8. After 4 more posted headers have been transmitted to the receive buffer 46 and processed, the PH field of the register 42 is updated to 12. The transmitter may maintain a credits consumed value for each set of credits, which may be compared to the credits allocated value to determine if credits are available to transmit a transaction. It is noted that the credits allocated register 42 may not be implemented in other embodiments (e.g. for other interfaces that consume and increment a credit count rather than track all credits since initialization).

The credits register 50 may be programmable (e.g. via instructions executed on a processor 18A-18B) with the total number of credits in each set of credits. The credits register 50 may be programmed prior to initialization on the peripheral interface, and the values in the credits register 50 may be advertised as the number of credits during such initialization. Additionally, in embodiments in which the thresholds are measured as a percentage of the total number of credits, the values in the credits register 50 may be used with the percentages to compute values for comparison to the credits freed register 44.

The number of credits consumed and freed for a particular transaction (or transaction's header and data) may be determined in a variety of fashions. For example, one credit (or one header credit and one data credit, if data is transmitted) may be consumed/freed for each packet. Alternatively, credits may measure a specified amount of header/data and the number of credits consumed/freed may depend on the size of the transaction and the specified amount. For example, in PCIe, each data credit is 4 double words of data. So, the number of credits consumed by the data for a transaction may be the number of double words of data divided by 4, rounding up.

It is noted that, in addition to generating UpdateFC requests in response to the number of freed credits exceeding a corresponding threshold, the peripheral interface controller 32 may also generate UpdateFC requests as defined in the PCIe specification. For example, UpdateFC requests may be generated using any of the mechanisms described in the background section above. Other embodiments that implement other interfaces may generate flow control update requests as defined by the protocol on those interfaces.

While the above embodiment has separate thresholds for each set of credits, other embodiments may have separate thresholds per transaction type, separate thresholds for data vs. header (command), or even a single threshold applied to each set of credits. For example, a single threshold expressed as a percentage of total credits may be used for each set of credits to determine if a flow control update is needed for that set, based on the total number of credits assigned to that set.

It is noted that, while individual registers 42, 44, 48, and 50 are shown in FIG. 2, other embodiments may implement two or more registers for each illustrated register, as desired.

While the illustrated embodiment maintains credits on a transaction type basis, other embodiments may implement different sets of credits, defined according to the interface that is being implemented. For example, various embodiments may have only separate credits for headers (or commands) and for data. Other embodiments may have separate credits for different transaction types, but use the same credits for headers (or commands) and data.

Posted transactions may comprise transactions which are considered to be complete by the transmitter once the transactions have been successfully transmitted on the interface.

That is, the transmitter may complete the posted transaction (e.g. releasing resources in the transmitter that are allocated to the transaction) before the posted transaction is completed at its destination. Completions are not required for posted transactions. In PCIe, posted transactions may include memory write transactions and message transactions. Nonposted transactions may comprise transactions for which an acknowledgement by the destination of the transaction is needed to complete the transaction at the transmitter. The acknowledgement may be, e.g., a completion. The nonposted transactions in PCIe may include memory read transactions (for which the completion includes the data returned in response to the read) as well as I/O and configuration transactions (both read and write). Completions are transactions which complete earlier-issued transactions. Completions may include data completions (e.g. in response to read transactions and including the read data) and non-data completions. Non-data completions may indicate completion of a corresponding transaction and may report errors, if any. Other embodiments may implement other transaction types and/or other interfaces.

The receive buffer 46 may generally comprise any semiconductor memory or memories (e.g. random access memory (RAM) arrays, content addressable memory (CAM) arrays, registers, flops, latches, other clocked storage devices, or any combination thereof) arranged as a set of entries, where each entry is configured to store a transaction request and corresponding information. Exemplary entries 46A-46B are illustrated in FIG. 2. Each entry includes a request field and a status field. The request field may store the transaction, which may include various information to be transmitted to the IOB 22 for the transaction such as transaction type, address, size, control information, etc. The status field may be used to track the progress of the transaction, indicate its validity, etc.

In the present embodiment, a common receive buffer 46 stores received transactions of all types into separate queues. For example, the PCIe specification defines posted transactions, nonposted transactions, and completion transactions. Other embodiments may implement separate buffers for different transactions, or transaction types may be grouped into one or more groups for sharing common receive buffers. It is further noted that, in some embodiments, the peripheral interface controller 32 may control more than one PCIe interface. For example, the PHY 36 may include 24 SERDES lanes, programmable as either PCIe lanes or Ethernet. Up to 8 logical PCIe interfaces may be supported. Thus, 8 sets of credits may be supported (and eight sets of registers similar to the registers 42, 44, 48, and 50). The receive buffer 46 may be common to all 8 interfaces, or separate receive buffers may be provided for each interface (and each transaction type within the interface, if desired).

Figure 3:
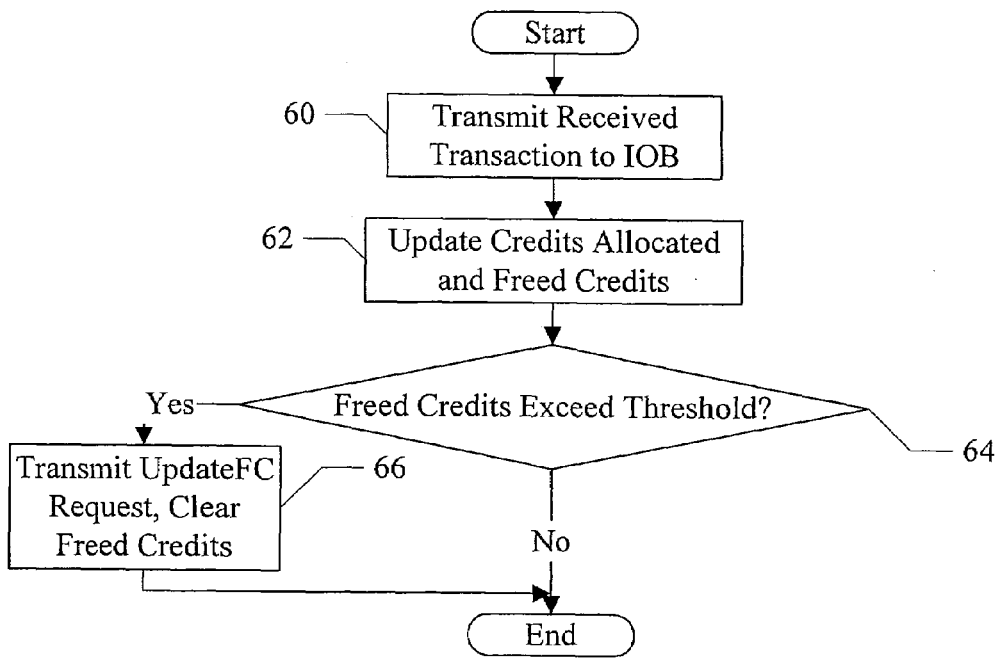
FIG. 3 is a flowchart illustrating operation of one embodiment of a peripheral interface controller to generate flow control credit updates.

Turning now to FIG. 3, a flowchart is shown illustrating operation of one embodiment of the peripheral interface controller 32 (and more particularly the control unit 40 shown in FIG. 2) for generating UpdateFC requests. While the blocks are shown in a particular order for ease of understanding, other orders may be used. Blocks may be performed in parallel by combinatorial logic within the control unit 40. Blocks, combinations of blocks, and/or the flowchart as a whole may be pipelined over multiple clock cycles, in some embodiments.

The control unit 40 may transmit a received transaction from the receive buffer 46 to the IOB 22 (or cause the received transaction to be transmitted) (block 60). The control unit 40 may also update the credits allocated register 42 and the freed credits register 44 to reflect the credits freed by processing the received transaction (block 62). That is, the control unit 40 may add the freed credit(s) to the appropriate field or fields of credits allocated register 42 and the credits freed register 44. More specifically, the credits allocated register 42 may be updated when an UpdateFC packet is generated. The control unit 40 may determine if the freed credits accumulated in the peripheral control unit 32 exceeds a corresponding threshold (decision block 64). In some embodiments, the control unit 32 may also determine if the freed credits meet the corresponding threshold. If so (decision block 64, "yes" leg), the control unit 40 may generate an UpdateFC request to communicate the freed credits (or at least the freed credits with respect to one set of credits) to the transmitter on the PCIe link (block 66). Additionally, the freed credits may be deducted by the threshold amount from the freed credits register 44.

The information transmitted in the UpdateFC request may include the transaction type (or type and the virtual channel that it is in) for which credits are being transmitted, along with header versus data identification (if applicable) and an indication of the number of credits being freed. For example, in the PCIe protocol, the value from the credits allocated register 42 field that corresponds to the transaction type and the header and/or data (whichever is being transmitted) is provided in the UpdateFC request. Other embodiments may provide the actual number of credits being freed (e.g. from the credits freed register 44), which may be used to increment a running count of the number of free credits in the transmitter, for example.

Numerous variations and modifications will become apparent to those skilled in the art once the above disclosure is fully appreciated. It is intended that the following claims be interpreted to embrace all such variations and modifications.

What is claimed is:

1. A system comprising:
   at least one processor; and
   a peripheral interface controller coupled to the processor and coupled to receive transactions from a peripheral interface, wherein the peripheral interface controller is configured to accumulate freed credits for a given transaction type of a plurality of transaction types, wherein the freed credits correspond to transactions of the given transaction type, and wherein the transactions were received by the peripheral interface controller from the peripheral interface, and wherein the peripheral interface controller is configured to accumulate the freed credits for a plurality of transactions of the given transaction type, wherein the freed credits are not yet returned to a transmitter on the peripheral interface, and wherein the peripheral interface controller is configured to cause transmission of a flow control update transaction on the peripheral interface to the transmitter on the peripheral interface responsive to a number of the freed credits at the peripheral interface controller meeting or exceeding a threshold amount that is less than a total number of credits allocated to the given transaction type, and wherein the peripheral interface controller is configured to generate the flow control update transaction without regard to a number of available credits at the transmitter, and wherein the flow control update transaction communicates the freed credits to the transmitter, and wherein the peripheral interface controller is configured to accumulate the freed credits only for transactions received by the peripheral interface controller from the single transmitter on the peripheral interface to which the peripheral interface controller is coupled, and wherein the peripheral interface controller is configured to generate the flow control update transaction only for the single transmitter on the peripheral interface to which the peripheral interface controller is coupled.

2. The system as recited in claim 1 wherein the threshold amount is programmable in the peripheral interface controller via instructions executed on the processor.

3. The system as recited in claim 1 wherein a separate threshold amount corresponds to each transaction type.

4. The system as recited in claim 3 wherein a separate flow control update transaction is used for each of the plurality of transaction types.

5. The system as recited in claim 3 wherein separate threshold amounts correspond to a data transmission of the given transaction type and a command transmission of the given transaction type.

6. The system as recited in claim 5 wherein the command transmission comprises a packet header and the peripheral interface is packet-based.

7. The system as recited in claim 1 wherein the plurality of transaction types include a posted transaction type, a non-posted transaction type, and a completion transaction type.

8. The system as recited in claim 1 wherein the peripheral interface controller is configured to generate the flow control update transaction on the peripheral interface responsive to the number of credits meeting the threshold amount.

9. The system as recited in claim 1 wherein the threshold amount is measured as a percentage of the total number of credits.

10. The system as recited in claim 1 wherein the threshold amount is measured in credits.

11. The system as recited in claim 1 wherein the peripheral interface controller is also configured to transmit the flow control update transaction responsive to the peripheral interface controller having at least one freed credit and further responsive to the number of available credits at the transmitter being less than a second number of credits required to transmit a largest transaction of the given transaction type.

12. An apparatus comprising:
   at least one buffer coupled to receive transactions from an interface; and
   a control unit coupled to the buffer, wherein the control unit is configured to generate a flow control update request to return freed credits to a transmitter on the interface responsive to a number of freed credits at the control unit that are not yet returned to the transmitter meeting or exceeding a threshold amount, and wherein the control unit is configured to generate the flow control update request without regard to a number of available credits at the transmitter, and wherein the freed credits correspond to transactions received into the buffer from the interface for a given transaction type of a plurality of transaction types, wherein the control unit is configured to accumulate the freed credits for a plurality of transactions of the given transaction type, and wherein the threshold amount is less than a total number of credits allocated to the given transaction type, and wherein the control unit is configured to accumulate the freed credits only for transactions received into the buffer from the single transmitter on the interface to which the buffer is coupled, and wherein the control unit is configured to generate the flow control update request only for the single transmitter that is coupled to the interface from which the buffer is configured to receive transactions.

13. The apparatus as recited in claim 12 wherein a separate threshold amount corresponds to each transaction type.

14. The apparatus as recited in claim 13 wherein a separate flow control update request is used for each of the plurality of transaction types.

15. The apparatus as recited in claim 13 wherein separate threshold amounts correspond to a data transmission of the given transaction type and a command transmission of the given transaction type.

16. The apparatus as recited in claim 12 wherein the threshold amount is measured as a percentage of the total number of credits.

17. The apparatus as recited in claim 12 wherein the threshold amount is measured in credits.

18. A method comprising:
   a peripheral interface controller processing a plurality of transactions received by the peripheral interface controller with respect to a given transaction type on an interface, wherein processing the transactions frees flow control credits used to flow control on the interface for the given transaction type, the freed flow control credits accumulated for the plurality of transactions of the given transaction type, and the peripheral interface controller accumulating the freed credits only for transactions received by the peripheral interface controller from a single transmitter on the interface to which the peripheral interface controller is coupled; and
   the peripheral interface controller generating a flow control update request to return freed flow control credits to the single transmitter on the interface responsive to a number of the freed flow control credits at the peripheral interface controller meeting or exceeding a threshold amount that is less than a total number of credits allocated to the given transaction type, and wherein the peripheral interface controller generating the flow control update request is performed without regard to a number of available credits at the transmitter, and the peripheral interface controller generating the flow control update transaction only for the single transmitter on the interface to which the peripheral interface controller is coupled.

19. The method as recited in claim 18 wherein separate threshold amounts correspond to a data transmission on the given transaction type and a command transmission on the given transaction type.

20. The method as recited in claim 18 wherein the threshold amount is measured as a percentage of the total number of credits.

21. The method as recited in claim 18 wherein the threshold amount is measured in credits.

* * * * *